Dec. 20, 1932.　　　H. G. ROBBINS　　　1,891,779
APPARATUS FOR TRANSPORTING LIVE FISH
Filed Oct. 8, 1929　　2 Sheets-Sheet 2
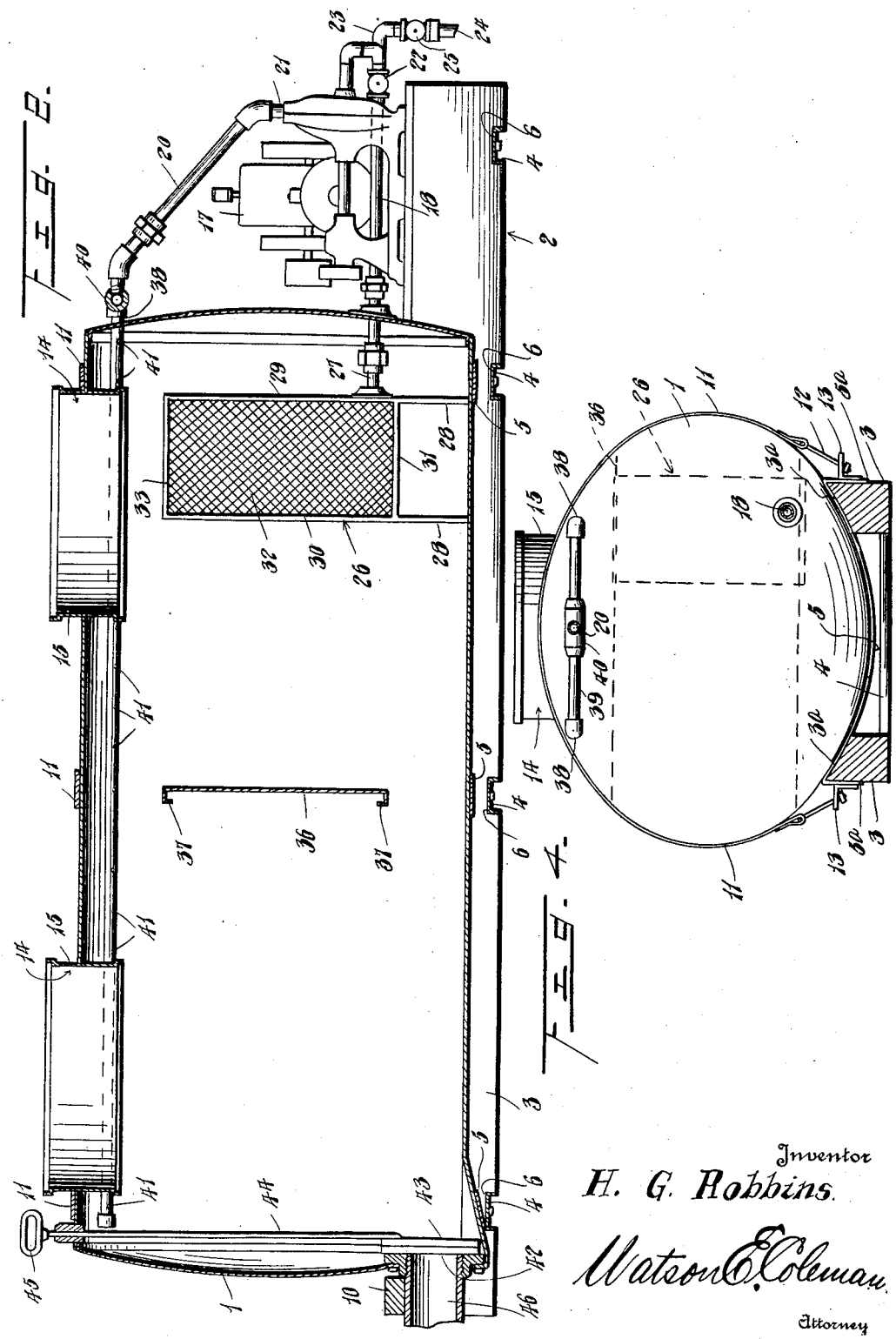
Inventor
H. G. Robbins.
Watson E. Coleman
Attorney Patented Dec. 20, 1932

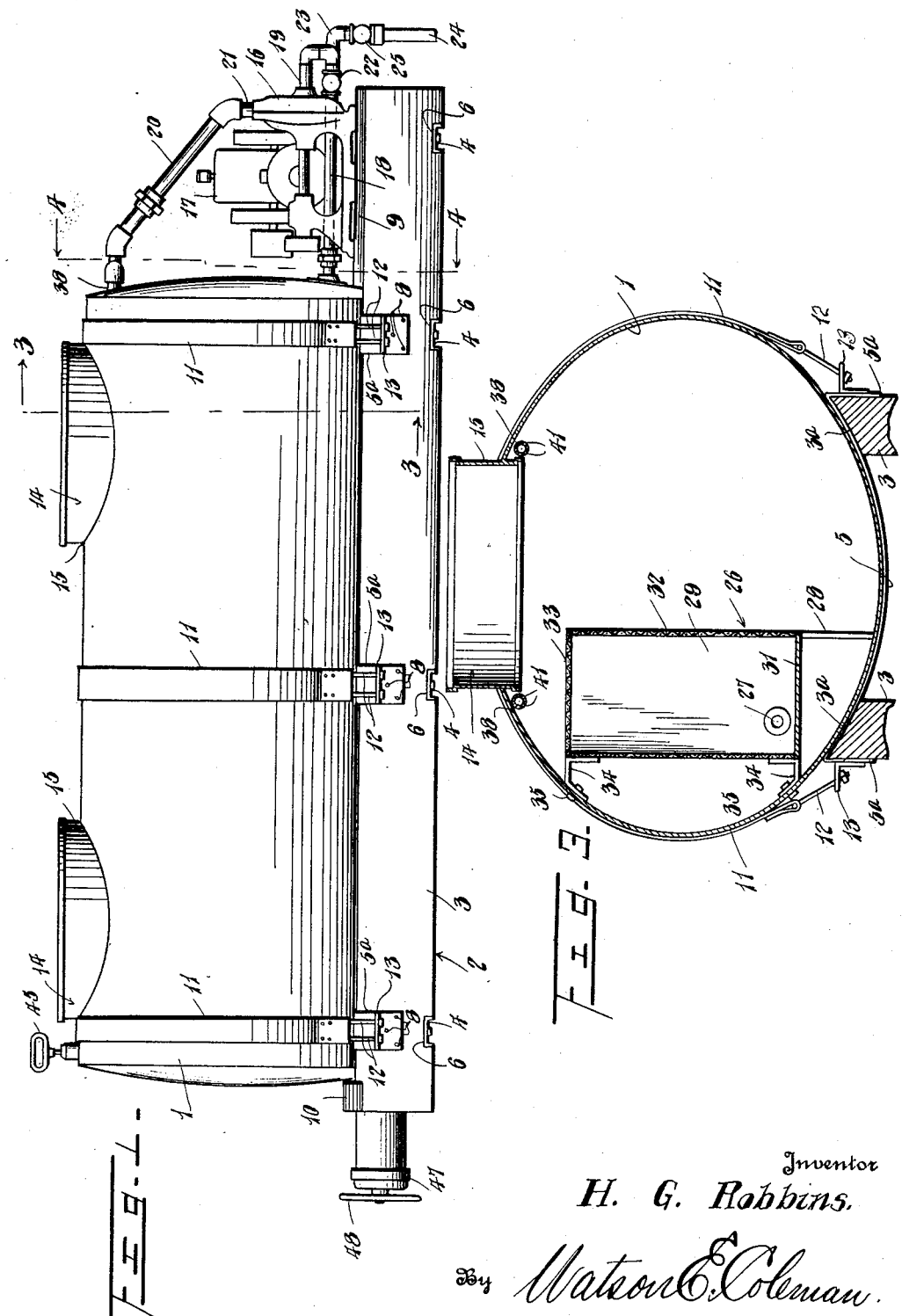

1,891,779

UNITED STATES PATENT OFFICE

HENRY GRANT ROBBINS, OF FOREST HOME, CALIFORNIA

APPARATUS FOR TRANSPORTING LIVE FISH

Application filed October 8, 1929. Serial No. 398,224.

This invention relates to apparatus for transporting live fish, and has for one of its objects to provide a novel, simple and highly efficient apparatus of this character which shall be especially adapted to transport live trout, which may be readily mounted upon and removed from an automobile or other truck or chassis, and which may be manufactured and sold at a comparatively low cost.

To attain the foregoing and other objects, the nature of which will appear as the description proceeds, the invention comprehends the provision of an apparatus of the character stated which shall embody a tank and a bed upon which the tank shall be secured and through the medium of which the tank may be secured to an automobile or other truck or chassis.

The invention further comprehends the provision of an apparatus of the character stated which shall embody a pump and an engine therefor mounted upon the bed at one end of the tank.

The invention further comprehends the provision of an apparatus of the character stated wherein the pump shall be connected to the tank in a manner to insure the constant circulation of the water in the tank and to also insure the thorough aeration of the water.

The invention is hereinafter fully described and claimed, and illustrated in the accompanying drawings, wherein:—

Figure 1 is a view in side elevation of the fish transporting apparatus,

Figure 2 is a sectional view taken on a vertical plane extending longitudinally and centrally through the apparatus, Figure 3 is a sectional view taken on the vertical plane indicated by the line 3—3 of Figure 1, and Figure 4 is a sectional view taken on the vertical plane indicated by the line 4—4 of Figure 1.

The fish transporting apparatus comprises a tank 1 and a bed 2 for the tank. The bed 2 consists of side beams or timbers 3, tie bars 4 and saddles 5. The tie bars 4 are made of metal and are of channel formation. The ends of the tie bars 4 are arranged in recesses 6 formed in the lower sides of the timbers 3, and are secured to the timbers by cap screws 7. The tie bars 4 are flush with the lower sides of the timbers 3, in view thereof the apparatus may be readily slid onto and off of an automobile or truck or chassis. The saddles 5, which are made of metal, are of arcuate formation and arranged with their convex sides in contact with the downwardly and inwardly curved sides 3a of the timbers 3. The saddles 5 are provided with angular ends 5a which are arranged in contact with the outer sides of the timbers 3 and secured thereto by bolts 8. A platform 9 is secured upon the front end portions of the timbers 3, and a cross bar 10 is secured upon the rear end portions of the timbers, the platform and this cross bar being made of wood.

The tank 1, which is made of metal, is shorter than the timbers 3, and is mounted upon the saddles 5 between the platform 9 and cross bar 10. The tank 1 is secured to the bed 2 by metal straps 11 which surround the tank and are connected by bolts 12 to brackets 13 carried by and secured to the timbers 3 by the elements 8. The tank 1 is provided in its upper side and near its ends with manholes 14, and associated with the manholes are collars 15 which extend above and below the upper side of the tank.

Those portions of the manhole collars 15 that extend into the tank 1, constitute aprons which prevent the water from splashing out of the manholes while the apparatus is being transported over rough roads. Such collar portions will not, however, prevent the water from running around in the tank 1 while the apparatus is being transported over rough roads.

A rotary water pump 16, and an internal combustion engine 17 for the pump, are secured upon the platform 9. The pump 16 and its engine 17 may be of any well known or appropriate construction, and any well known or appropriate means may be employed for establishing a driving connection between the engine and pump. A pipe 18 extends from a point near the bottom of the tank 1 to the intake port 19 of the pump 16, and a pipe 20 extends from the discharge port 21 of the pump to a point near the upper side of the tank. The pipe 18 enters the tank 1 through the front end thereof. The pipe 18 is provided with a cut-off valve 22 and a coupling 23. The coupling 23 is arranged between the valve 22 and the intake port 19 of the pump 16, and it provides means through the medium of which a hose may be connected with the intake port of the pump. The hose 24, a fragmentary portion only of which is shown, permits the tank 1 to be supplied with water from a pool or pond while the apparatus is en route. The valve 22 is closed, and a valve 25 in the coupling 23 is opened, while the tank 1 is being supplied with water, and after the tank has been filled valve 22 is opened and the valve 25 closed.

A guard 26 is removably arranged within the tank 1 and is detachably connected to the inlet end of the pipe 18 by a coupling 27. The guard 26, which serves to prevent the fish from entering the pipe 18, is of rectangular formation and is provided with legs 28 which rest upon the bottom of the tank 1. The front side 29, the rear side 30 and the bottom 21 of the guard 26 are imperforate and the lateral sides 32 and the top 33 of the guard are perforated. All parts of the guard are made from metal, and the lateral sides 32 and the top 33 thereof are made of wire cloth.

The guard 26 is detachably connected to one lateral side of the tank 1 by brackets 34 and bolts 35. As the guard 26 is removable, a guard having its lateral sides and top provided with different size openings may be substituted therefor and thus adapt the apparatus for transporting fish of different sizes.

An imperforate anti-surging baffle or splash plate 36 extends across the tank 1 at the transverse center thereof. Its ends are secured in any suitable manner to the lateral sides of the tank 1, its upper and lower edges are spaced from the bottom and top of the tank. The baffle or splash plate 34 may be made of light sheet metal, and its longitudinal edges are bent to provide reinforcing flanges 37.

Pipes 38 are arranged within the upper side of the tank 1 and extend throughout the entire length of the tank at opposite sides of its longitudinal center. The rear ends of the pipes 38 are closed and their front ends are connected by a cross pipe 39. The cross pipe 39 is connected to the discharge end of the pipe 20 by a coupling 40. The pipes 38 are arranged above the normal level of the water in the tank 1, and they are provided along their lower sides with fine openings 41. It is to be noted from Figures 2 and 3 that the pipes 38 are disposed on each side of the collars 15 and that these pipes are provided on their lower inside faces as well as on their lower outside faces with the spray openings 41. It follows, therefore, that a certain amount of spray will be discharged downward and across the axes of the openings 41 so that the sprays will traverse the columns of air moving downward through the man holes 14. The pipes 38 are located at opposite sides of these aprons formed by the downward extensions of the collars 14 and close to the edges thereof. Thus the water is sprayed into the air circulating longitudinally through the upper side of the tank. The baffle plate 36 is located centrally between these aprons and serves to prevent undue surging of the water and also to prevent the current set up in the water from carrying the fish against the wire screen 32 and furthermore tends to cause a circulation of the water longitudinally of the tank.

During the operation of the pump 16, the water passes from the bottom of the tank 1 into the pump 16 by way of the pipe 18, it passes from the pump to the pipes 38 by way of the pipes 20 and 39, and it passes from the pipes 38 in the form of fine sprays. As the water is returned to the tank 1 in the form of fine sprays it is so thoroughly aerated that oxygen is supplied thereto as rapidly as it is used up by the fish.

The tank 1 is provided, in its rear end and in alinement with its bottom, with a discharge opening 42 through which the water and the fish are removed from the tank. A slide valve 43 is provided for the opening 42, and a control rod 44 is connected to the valve and extends through the upper end of the tank 1, the rod being provided at its upper end with a hand loop 45. An outlet pipe 46 is secured to the rear end of the tank 1 about the discharge opening 42, and has its rear end closed by a cap 47 screw-threadedly engaged therewith and provided with a manipulating handle 48. The outlet pipe 46 extends longitudinally from the tank 1 between the beams 3. The outlet pipe 46, the tie bars 4, the angular ends 5a of the saddles 5, and the brackets 13 to which the straps 11 are terminally secured, are located above the lower sides of the beams and such sides of the beams are straight throughout their entire length to the end that the apparatus may be slid onto and off of an automobile truck or chassis with the beams functioning as runners. The location of the outlet pipe 46 between the beams protects the pipe especially at its point of connection with the tank 1. The platform 9 and cross bar 10 contact with the ends of the tank 1 and serve to hold it against longitudinal movement with relation to the beams 3.

From the foregoing description, taken in connection with the accompanying drawings, it should be understood that the apparatus is a unitary structure which may be readily placed upon and removed from an automobile or other truck or chassis, that the apparatus may be used for the purpose of transporting fish from a hatchery or from a tank car to the lake, stream or river to be stocked, that it permits the tank to be supplied with fresh water from a pond or the like while en route and that the apparatus permits the fish to be deposited in the lake, stream or river without injury thereto.

If desired, the pump 16 and its engine 17 may be mounted at the rear end of the tank 1, and when this is done, the guard 26 will be arranged near the rear end of the tank and the pipes 18 and 38 will be extended through the rear end of the tank.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A fish transporting apparatus, comprising parallel side beams having straight lower sides and downwardly and inwardly curved upper sides, tie bars connecting the beams and flush with the lower sides thereof, arcuate saddles having portions thereof resting upon the curved upper sides of the beams and having angular ends secured to the outer sides of the beams, the saddles being arranged with their concave sides uppermost and having their angular ends located above the lower sides of the beams, a tank of substantially elliptical formation in cross section and shorter than the beams and resting upon the saddles, brackets secured to the outer sides of the beams above the lower sides thereof, straps surrounding the tank and secured to the brackets, the beams extending beyond the ends of the tank, a cross bar and a platform mounted upon the extended ends of the beams and contacting with the ends of the tank, means adapted to maintain the water in the tank in circulation and mounted upon the platform, and an outlet pipe for the tank located between the beams and above the lower sides thereof.

2. A fish transporting apparatus comprising a tank adapted to contain water and provided in its upper side with openings located near the ends of the tank to provide for the circulation of air longitudinally through the upper side of the tank, a pump and operating means therefor, the pump being located outside the tank and having an intake port and a discharge port, the intake port communicating with the lower side of the tank, and pipes extending longitudinally of the upper side of the tank and having certain of their ends closed and communicating at their other ends with the discharge port of the pump, the pipes being located at opposite sides of the openings and close to the lateral walls thereof and provided in their lower sides with fine outlet openings through which the water is sprayed into the air circulating longitudinally through the upper side of the tank.

3. A fish transporting apparatus comprising a tank adapted to contain water and provided in its upper side with openings located near the ends of the tank to provide for the circulation of air longitudinally through the upper side of the tank, collars secured to the upper side of the tank and extending downwardly through the openings for a short distance to provide aprons adapted to prevent the water from splashing out of the openings, an imperforated splash plate extending across the interior of the tank centrally between the openings and having its upper and lower edges spaced from the upper and lower sides of the tank, a pump and operating means therefor, the pump being located outside the tank and having an intake port and a discharge port, the intake port communicating with the lower side of the tank, and pipes extending longitudinally of the upper side of the tank and having certain of their ends closed and communicating at their other ends with the discharge port of the pump, the pipes being located close to opposite sides of the collars and close to the lower edges thereof and provided in their lower sides with fine outlet openings through which the water is sprayed into the air circulating longitudinally through the upper side of the tank.

4. A fish transporting apparatus comprising a tank adapted to contain water and provided in its upper side with openings permitting the circulation of air longitudinally through the upper portion of the tank, collars secured to the wall of the tank and extending downwardly through the openings for a short distance to provide aprons preventing the water from splashing out of said openings, a pump, and operating means therefor, the pump being located outside the tank and having an intake port and a discharge port, the intake port communicating with the lower side of the tank, and pipes extending longitudinally within the upper portion of the tank, and having their inner ends closed and communicating at their other ends with the discharge port or pump, the pipes being located close to opposite sides of the collars and close to the lower edges thereof and being provided with outlet openings discharging downward and across the axes of said collars by which water is sprayed into the air circulating longitudinally through the upper side of the tank and passing downward through said openings defined by the collars.

In testimony whereof I hereunto affix my signature.

HENRY GRANT ROBBINS.